US012638412B2

(12) United States Patent
Hiramatsu

(10) Patent No.: US 12,638,412 B2
(45) Date of Patent: May 26, 2026

(54) SENSOR AND CAPACITOR DEVICE

(71) Applicant: KABUSHIKI KAISHA TOSHIBA, Tokyo (JP)

(72) Inventor: Naoki Hiramatsu, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 376 days.

(21) Appl. No.: 18/352,140

(22) Filed: Jul. 13, 2023

(65) Prior Publication Data

US 2024/0302310 A1      Sep. 12, 2024

(30) Foreign Application Priority Data

Mar. 7, 2023    (JP) .................................. 2023-034896

(51) Int. Cl.
*G01N 27/22* (2006.01)
*H01G 4/005* (2006.01)

(52) U.S. Cl.
CPC ........... *G01N 27/226* (2013.01); *H01G 4/005* (2013.01); *G01N 2027/222* (2013.01)

(58) Field of Classification Search
CPC ............. G01N 27/22; G01N 2072/222; G01N 27/226
See application file for complete search history.

(56) References Cited

U.S. PATENT DOCUMENTS

| | | | |
|---|---|---|---|
| 2019/0086377 A1 | 3/2019 | Ikehashi et al. | |
| 2023/0078060 A1* | 3/2023 | Yamazaki .............. | G01R 1/203 |
| | | | 324/126 |

FOREIGN PATENT DOCUMENTS

JP          2019-56607 A      4/2019

* cited by examiner

*Primary Examiner* — Erika J. Villaluna
(74) *Attorney, Agent, or Firm* — Finnegan, Henderson, Farabow, Garrett & Dunner, LLP

(57) ABSTRACT

According to one embodiment, a sensor includes a base including a first base region and a second base region, and an element section. The element section includes a fixed electrode fixed to the second base region, a first fixed member fixed to the first base region, a first intermediate member supported by the first fixed member, a first connecting member supported by the first intermediate member, a movable portion, and a first support member. The first connecting member includes a first connecting portion, a second connecting portion, and a third connecting portion. The movable portion is connected to the second connecting portion. The movable portion includes a movable electrode. A first gap is provided between the fixed electrode and the movable portion. The first support member is fixed to the base. The first support member supports the third connecting portion.

17 Claims, 4 Drawing Sheets

SENSOR AND CAPACITOR DEVICE

CROSS-REFERENCE TO RELATED APPLICATIONS

This application is based upon and claims the benefit of priority from Japanese Patent Application No. 2023-034896, filed on Mar. 7, 2023; the entire contents of which are incorporated herein by reference.

FIELD

Embodiments described herein relate generally to a sensor and a capacitor device.

BACKGROUND

For example, there are sensors that detect gases such as hydrogen. It is desired to improve the characteristics of the sensor.

DETAILED DESCRIPTION

Figure 1:
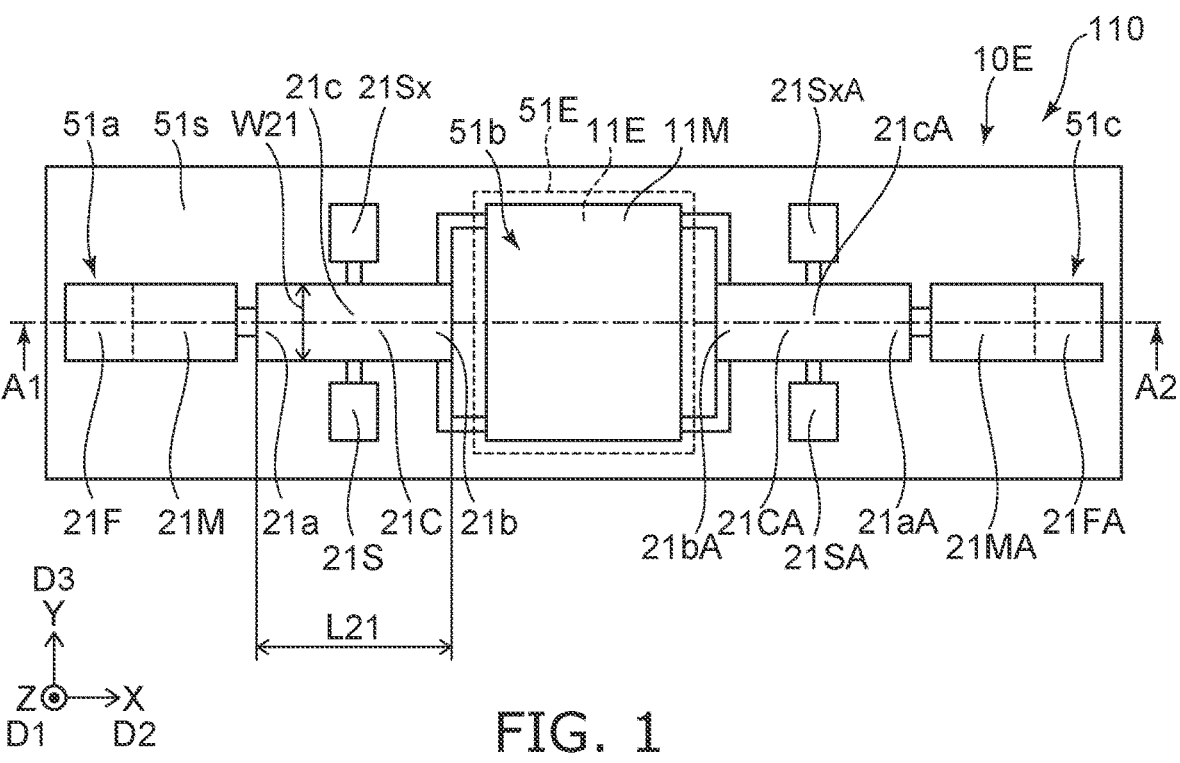
FIG. 1 is a schematic plan view illustrating a sensor according to a first embodiment.

According to one embodiment, a sensor includes a base including a first base region and a second base region, and an element section. The element section includes a fixed electrode fixed to the second base region, a first fixed member fixed to the first base region, a first intermediate member supported by the first fixed member, a first connecting member supported by the first intermediate member, a movable portion, and a first support member. The first connecting member includes a first connecting portion, a second connecting portion, and a third connecting portion between the first connecting portion and the second connecting portion. A direction from the first connecting portion to the second connecting portion is along a second direction crossing a first direction from the first base region to the first fixed member. The movable portion is connected to the second connecting portion. The movable portion includes a movable electrode. A first gap is provided between the fixed electrode and the movable portion. The first support member is fixed to the base. The first support member supports the third connecting portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to a first embodiment.

Figure 2:
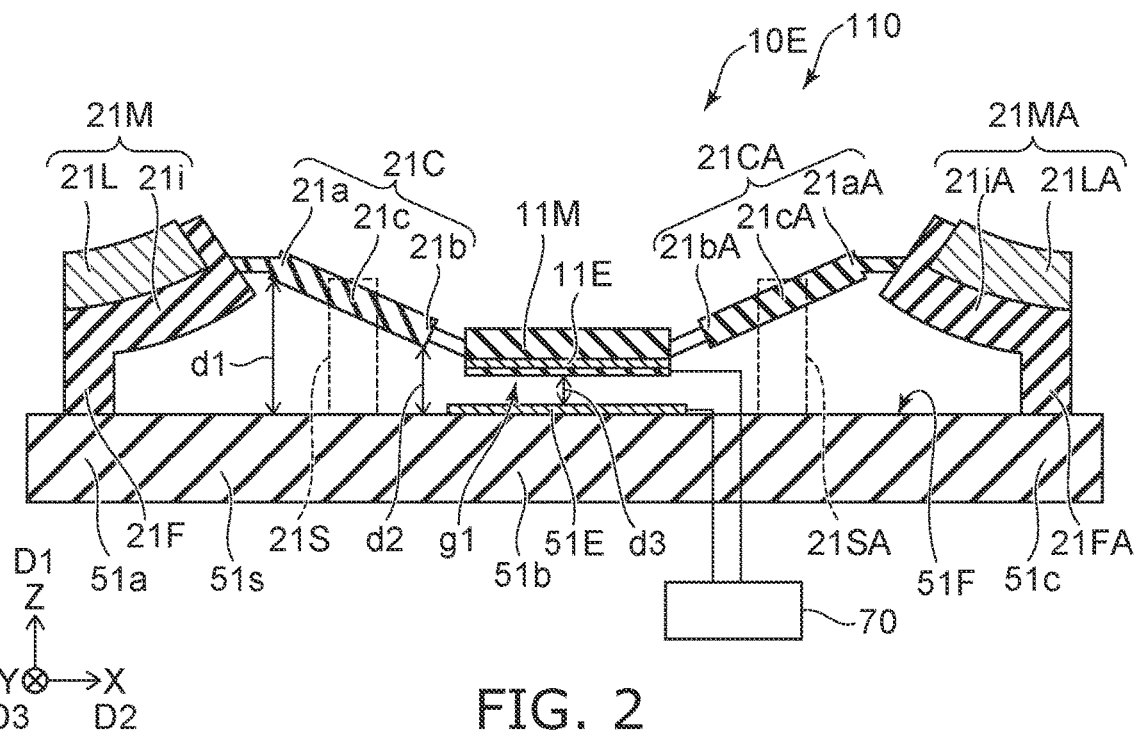
FIG. 2 is a schematic cross-sectional view illustrating the sensor according to the first embodiment.

FIG. 2 is a schematic cross-sectional view illustrating the sensor according to the first embodiment.

FIG. 2 is a cross-sectional view taken along the line A1-A2 of FIG. 1.

As shown in FIGS. 1 and 2, a sensor 110 according to the embodiment includes a base 51s and an element section 10E.

The base 51s includes a first base region 51a and a second base region 51b. In this example, the base 51s further includes a third base region 51c. The second base region 51b is between the first base region 51a and the third base region 51c.

The element section 10E includes a fixed electrode 51E, a first fixed member 21F, a first intermediate member 21M, a first connecting member 21C, a movable portion 11M, and a first support member 21S.

The fixed electrode 51E is fixed to the second base region 51b. The first fixed member 21F is fixed to the first base region 51a. A first direction D1 from the first base region 51a to the first fixed member 21F is defined as a Z-axis direction. A direction perpendicular to the Z-axis direction is defined as an X-axis direction. A direction perpendicular to the Z-axis direction and the X-axis direction is defined as the Y-axis direction.

As shown in FIG. 2, the base 51s includes a first face 51F. The first face 51F faces the fixed electrode 51E. The first face 51F is substantially parallel to the X-Y plane.

The first intermediate member 21M is supported by the first fixed member 21F. The first connecting member 21C is supported by the first intermediate member 21M. The first connecting member 21C includes a first connecting portion 21a, a second connecting portion 21b, and a third connecting portion 21c. The third connecting portion 21c is provided between the first connecting portion 21a and the second connecting portion 21b.

A direction from the first connecting portion 21a to the second connecting portion 21b is along a second direction D2. The second direction D2 crosses the first direction D1. The second direction D2 is, for example, the X-axis direction.

The movable portion 11M is connected to the second connecting portion 21b. The movable portion 11M includes a movable electrode 11E. A first gap g1 is provided between the fixed electrode 51E and the movable portion 11M. The first support member 21S is fixed to the base 51s. The first support member 21S supports the third connecting portion 21c. The first connecting member 21C has a torsion structure rotatable around the third connecting portion 21c.

As will be described below, the first intermediate member 21M is deformable according to a state of the detection target. The deformation of the first intermediate member 21M changes the rotation angle of the first connecting member 21C. This changes an inter-electrode distance d3 between the fixed electrode 51E and the movable electrode 11E. The change in the inter-electrode distance d3 changes the capacitance between the electrodes. The state of the detection target can be detected by detecting the change in capacitance. The state of the detection target is, for example, the concentration of the detection target. The capacitance may be detected, for example, by a controller 70 (see FIG. 2).

A distance between the base 51s and the first connecting portion 21a along the first direction D1 is defined as a first distance d1. A distance between the base 51s and the second connecting portion 21b along the first direction D1 is defined as a second distance d2. In the embodiment, as the first distance d1 decreases, the second distance d2 increases. As the first distance d1 increases, the second distance d2 decreases.

In one example, as shown in FIG. 2, the first intermediate member 21M includes a first layer 21L. The volume of the first layer 21L changes according to the concentration of the detection target. This is because the detection target enters the first layer 21L. For example, when the concentration of the detection target is high, the volume of the first layer 21L increases. Thereby, the first intermediate member 21M is deformed, and the first connecting portion 21a approaches the base 51s. On the other hand, the second connecting portion 21b is apart from the base 51s. Therefore, as the concentration of the detection target increases, the distance d3 between the electrodes increases, and the capacitance decreases.

On the other hand, a first reference example in which the first connecting member 21C is not provided is considered. In the first reference example, the first intermediate member 21M is connected to the movable portion 11M. In the first reference example, when the concentration of the detection target increases, the distance d3 between the electrodes decreases and the capacitance increases.

The capacitance is proportional to the reciprocal of the inter-electrode distance d3. In the first reference example, when the inter-electrode distance d3 in an initial state is set short, the inter-electrode distance d3 becomes excessively short in a case where the concentration of the detection target is high. As a result, for example, the movable portion 11M contacts the fixed electrode 51E. Proper operation is difficult. In the first reference example, the range of concentrations that can be detected properly (dynamic range) is narrow. On the other hand, in the first reference example, when the inter-electrode distance d3 in the initial state is set long, the change in capacitance with respect to the change in the concentration of the detection target becomes small. The sensitivity becomes decreased. Thus, in the first reference example, it is difficult to obtain wide dynamic range and high sensitivity.

In contrast, in the embodiment, when the concentration of the detection target increases, the inter-electrode distance d3 increases and the capacitance decreases. Even at high concentrations, the detection target can be detected properly. Even if the inter-electrode distance d3 is set short in the initial state, the inter-electrode distance d3 does not become shorter 30 than that in the initial state. Thereby, in the embodiment, the inter-electrode distance d3 in the initial state can be made smaller than the value in the first reference example. Thereby, detection with higher sensitivity can be possible. A wide dynamic range is obtained according to the embodiment. High sensitivity is obtained. According to the embodiment, it is possible to provide a sensor capable of improving characteristics.

As shown in FIG. 1, a third direction D3 from the first support member 21S to the third connecting portion 21c crosses a plane including the first direction D1 and the second direction D2. The third direction D3 is, for example, the Y-axis direction.

As shown in FIG. 1, the element section 10E may further include a first opposing support member 21Sx. The first opposing support member 21Sx is fixed to the base 51s. The first opposing support member 21Sx supports the third connecting portion 21c. The third connecting portion 21c is located between the first support member 21S and the first opposing support member 21Sx. A part of the first gap g1 is provided between the base 51s and the first connecting member 21C.

As shown in FIGS. 1 and 2, the element section 10E may further include a first other fixed member 21FA, a first other intermediate member 21MA, a first other connecting member 21CA, and a first other support member 21SA. As already described, the second base region 51b is between the first base region 51a and the third base region 51c.

The first other fixed member 21FA is fixed to the third base region 51c. The first other intermediate member 21MA is supported by the first other fixed member 21FA. The first other intermediate member 21MA may include a first other layer 21LA.

The first other connecting member 21CA is supported by the first other intermediate member 21MA. The first other connecting member 21CA includes a first other connecting portion 21aA, a second other connecting portion 21bA, and a third other connection porting 21cA. The third other connecting portion 21cA is provided between the first other connecting portion 21aA and the second other connecting portion 21bA. A direction from the second other connecting portion 21bA to the first other connecting portion 21aA is along the second direction D2.

The first other connecting portion 21aA is supported by the first other intermediate member 21MA. The second other connecting portion 21bA supports the movable portion 11M. The first other support member 21SA is fixed to the base 51s. The first other support member 21SA supports the third other connecting portion 21cA.

As shown in FIG. 1, the element section 10E may further include a first other opposing support member 21SxA. The first other opposing support member 21SxA is fixed to the base 51s. The first other opposing support member 21SxA supports the third other connecting portion 21cA. The third other connecting portion 21cA is located between the first other support member 21SA and the first other opposing support member 21SxA. As shown in FIG. 2, a part of the first gap g1 is provided between the base 51s and the first other connecting member 21CA.

In the embodiment, the base 51s may be, for example, a silicon substrate. A circuit such as a transistor may be provided on the silicon substrate. In the first fixed member 21F, the first intermediate member 21M, the first connecting member 21C, the movable portion 11M, the first support member 21S, and the like, the insulating portion may include, for example, silicon nitride. The fixed electrode 51E may include, for example, at least one selected from the group consisting of aluminum, copper, gold, titanium nitride, aluminum alloy, and Al—Cu alloy. The movable electrode 11E may include, for example, at least one selected from the group consisting of aluminum, copper, gold, titanium nitride, aluminum alloy, and Al—Cu alloy.

As shown in FIG. 2, the first intermediate member 21M may include the first layer 21L. The first layer 21L includes, for example, at least one selected from the group consisting of palladium (Pd), platinum (Pt) and gold (Au). The first layer 21L may further includes, for example, at least one selected from the group consisting of silicon (Si), phosphorus (P), boron (B), copper (Cu), silver (Ag), nickel (Ni), gold (Au), iron (Fe) and chromium (Cr). The first layer 21L may include, for example, an alloy including a first element and a second element. The first element includes at least one selected from the group consisting of Mg, Ti, Zr, Ca, La, Mn and V, for example. The second element includes, for example, at least one selected from the group consisting of Ni, Cu, Fe, Co, Cr, Mn, V and Nb. The above materials are capable of incorporating hydrogen, for example. By the incorporating hydrogen, the volume of the first layer 21L is increased. For example, the detection target (detection target gas) includes hydrogen.

In the embodiment, a length L21 (see FIG. 1) of the first connecting member 21C along the second direction D2 may be, for example, not less than 10 nm and not more than 1 mm. A length W21 (see FIG. 1) of the first connecting member 21C along the third direction D3 may be, for example, not less than 10 nm and not more than 1 mm.

As shown in FIG. 2, the first intermediate member 21M may further include a first insulating layer 21i. The first insulating layer 21i is located between the base 51s and the first layer 21L.

As shown in FIG. 2, the first other intermediate member 21MA may include a first other layer 21LA and a first other insulating layer 21iA. The first other insulating layer 21iA is located between the base 51s and the first other layer 21LA. The material of the first other layer 21LA may be the same as the material of the first layer 21L. The material of the first insulating layer 21iA may be the same as the material of the first insulating layer 21i.

Figure 3A:
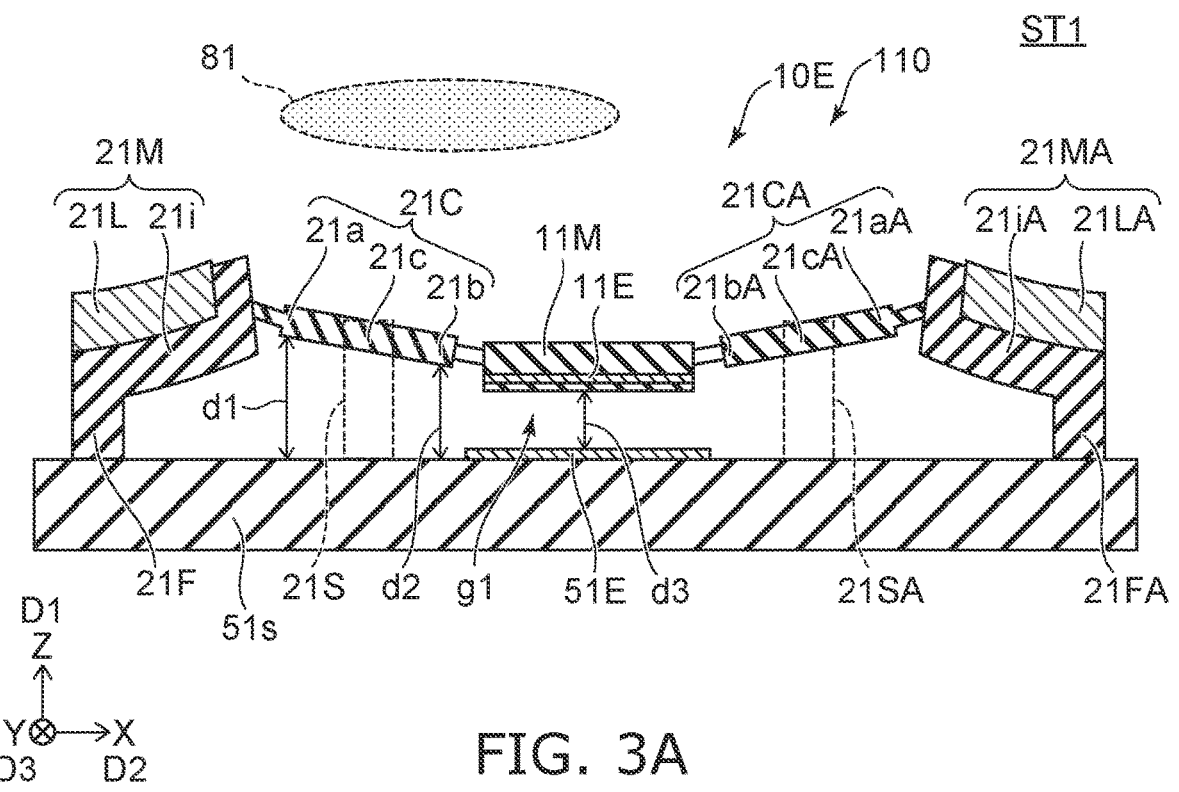
FIGS. 3A and 3B are schematic cross-sectional views illustrating the operation of the sensor according to the first embodiment.
Figure 3B:
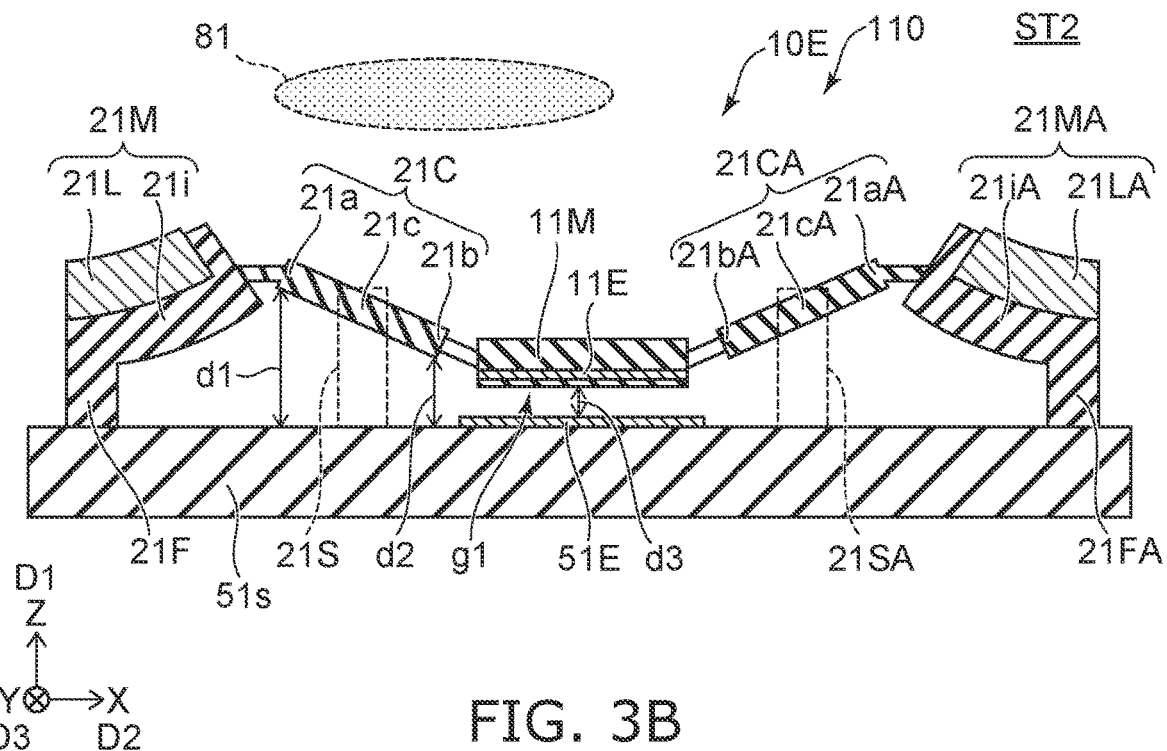

FIGS. 3A and 3B are schematic cross-sectional views illustrating the operation of the sensor according to the first embodiment.

FIG. 3A corresponds to a first state ST1. FIG. 3B corresponds to a second state ST2. The concentration of the detection target 81 (for example, detection target gas) existing around the element section 10E in the first state ST1 is higher than the concentration of the detection target 81 in the second state ST2. The second state ST2 is, for example, the initial state. The first state ST1 is, for example, a high concentration state.

As shown in FIGS. 3A and 3B, the first distance d1 along the first direction D1 between the base 51s and the first connecting portion 21a in the first state ST1 is shorter than the first distance d1 in the second state ST2. This is based on the operation that the volume of the first layer 21L increases in the first state ST1 with high concentration, and thus the first connecting portion 21a approaches the base 51s.

As shown in FIGS. 3A and 3B, the second distance d2 along the first direction D1 between the base 51s and the second connecting portion 21b in the first state ST1 is longer than the second distance d2 in the second state ST2. This is based on the operation that the first connecting portion 21a approaches the base 51s in the first state ST1 with high concentration, and thus the second connecting portion 21b moves away from the base 51s.

As a result, the inter-electrode distance d3 in the first state ST1 becomes longer than the inter-electrode distance d3 in the second state ST2. A wide dynamic range and high sensitivity are obtained.

Figure 4:
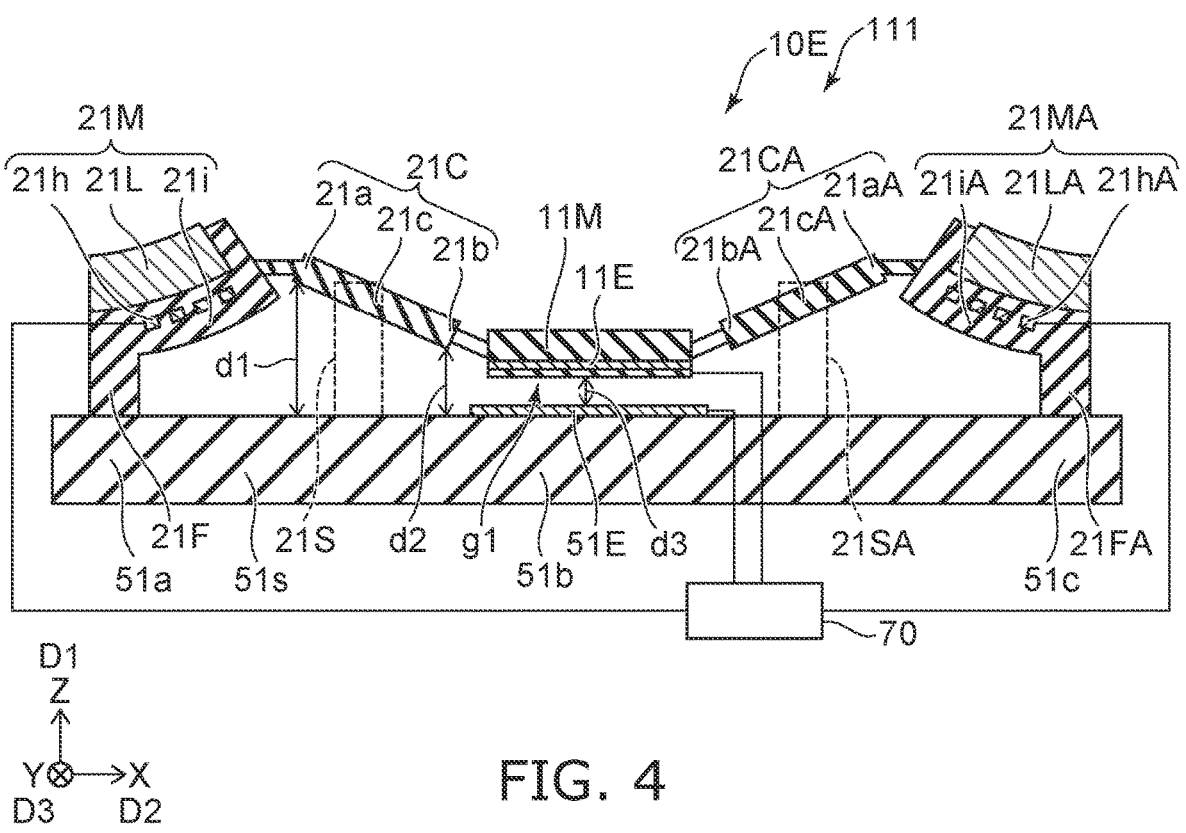
FIG. 4 is a schematic cross-sectional view illustrating a sensor according to the first embodiment.

FIG. 4 is a schematic cross-sectional view illustrating a sensor according to the first embodiment.

As shown in FIG. 4, in a sensor 111 according to the embodiment, the first intermediate member 21M further includes a first conductive member 21h. The first other intermediate member 21MA includes the first other conductive member 21hA. Except for these, the configuration of sensor 111 may be the same as the configuration the sensor 110.

In the first intermediate member 21M of the sensor 111, the first conductive member 21h is located between the base 51s and the first layer 21L. When a current is supplied to the first conductive member 21h, the first distance d1 along the first direction D1 between the base 51s and the first connecting portion 21a decreases. At this time, the second distance d2 along the first direction D1 between the base 51s and the second connecting portion 21b increases. The change in the distance is caused by the deformation of the first intermediate member 21M due to the thermal expansion cause by an increase in temperature of the first conductive member 21h.

The inter-electrode distance d3 changes according to the change in the second distance d2. The inter-electrode distance d3 can be controlled by controlling the current to the first conductive member 21h. For example, in the sensor 111, the inter-electrode distance d3 can be controlled according to the characteristics of the detection target 81. A wider dynamic range can be detected with higher accuracy.

As shown in FIG. 4, the controller 70 may be provided. The controller 70 is configured to supply current to the first conductive member 21h. As shown in FIG. 4, the first other intermediate member 21MA may include a first other conductive member 21hA. By supplying the current to the first other conductive member 21hA, the first other intermediate member 21MA is deformed, and the inter-electrode distance d3 can be controlled.

Figure 5:
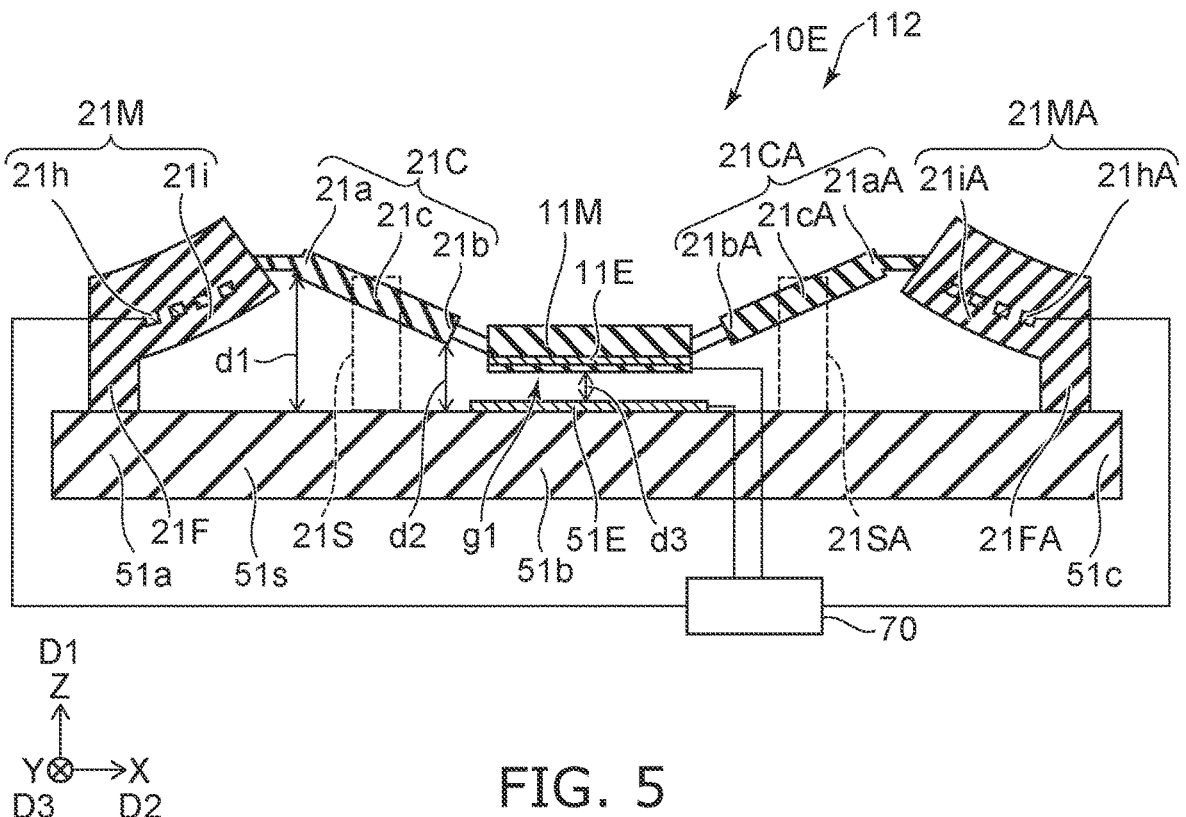
FIG. 5 is a schematic cross-sectional view illustrating a sensor according to the first embodiment.

FIG. 5 is a schematic cross-sectional view illustrating a sensor according to the first embodiment.

As shown in FIG. 5, in a sensor 112 according to the embodiment, the first layer 21L and the first other layer 21LA are omitted. Except for this, the configuration of the sensor 112 may be the same as the configuration of the sensor 110 or the sensor 111.

In the sensor 112, for example, the current is supplied to the first conductive member 21h and the first other conductive member 21hA. The degree of temperature rise of the first intermediate member 21M and the first other intermediate member 21MA depends on the state of the detection target 81 existing around the element section 10E. For example, when heat is taken away by the detection target 81, the degree of increase in temperature is low. Thereby, the detection target 81 can be detected. A wide dynamic range is also obtained in the sensor 112. High accuracy is obtained.

In the sensor 112, when the current is supplied to the first conductive member 21h, the first distance d1 along the first direction D1 between the base 51s and the first connecting portion 21a decreases. When the current is supplied, the second distance d2 along the first direction D1 between the base 51s and the second connecting portion 21b increases. The sensor 112 may include the controller 70. The controller 70 is configured to supply the current to the first conductive member 21h (and the first other conductive member 21hA).

The configuration of the sensor 112 illustrated in FIG. 5 can be used as a capacitor device with variable capacitance.

Second Embodiment

The second embodiment relates to the capacitor device.

Figure 6:
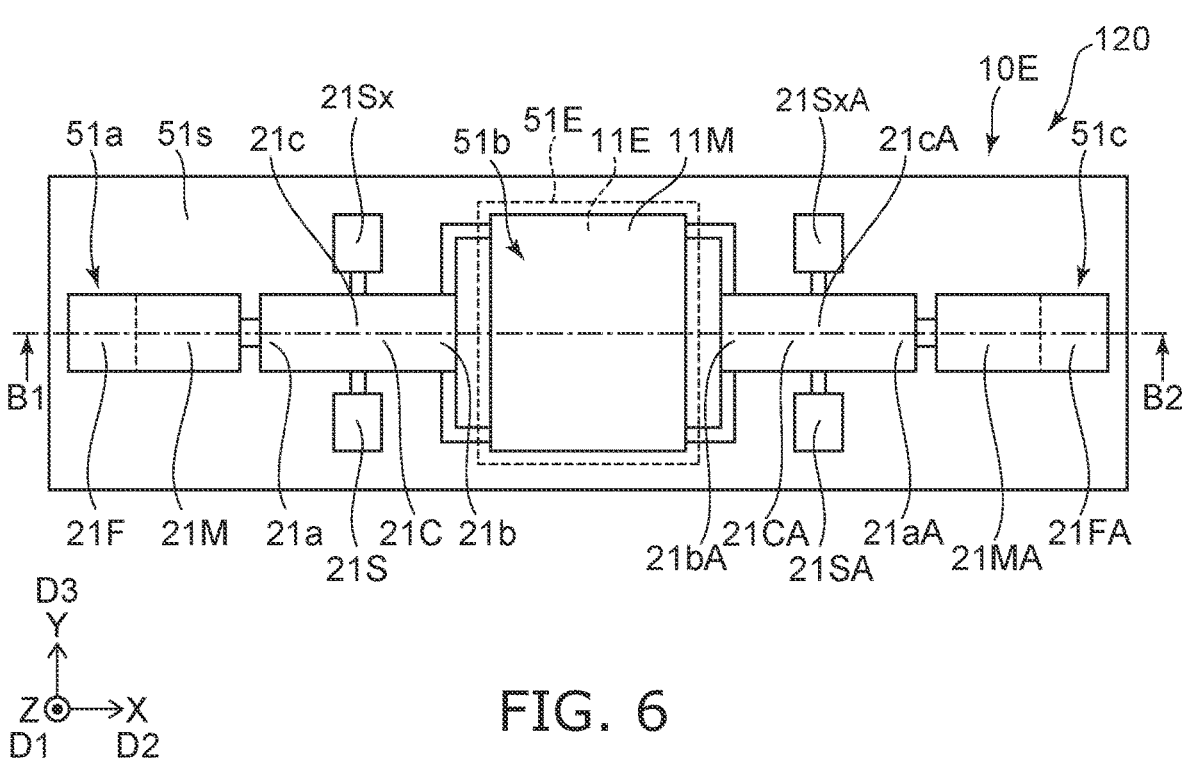
FIG. 6 is a schematic plan view illustrating a capacitor device according to a second embodiment.

FIG. 6 is a schematic plan view illustrating a capacitor device according to a second embodiment.

Figure 7:
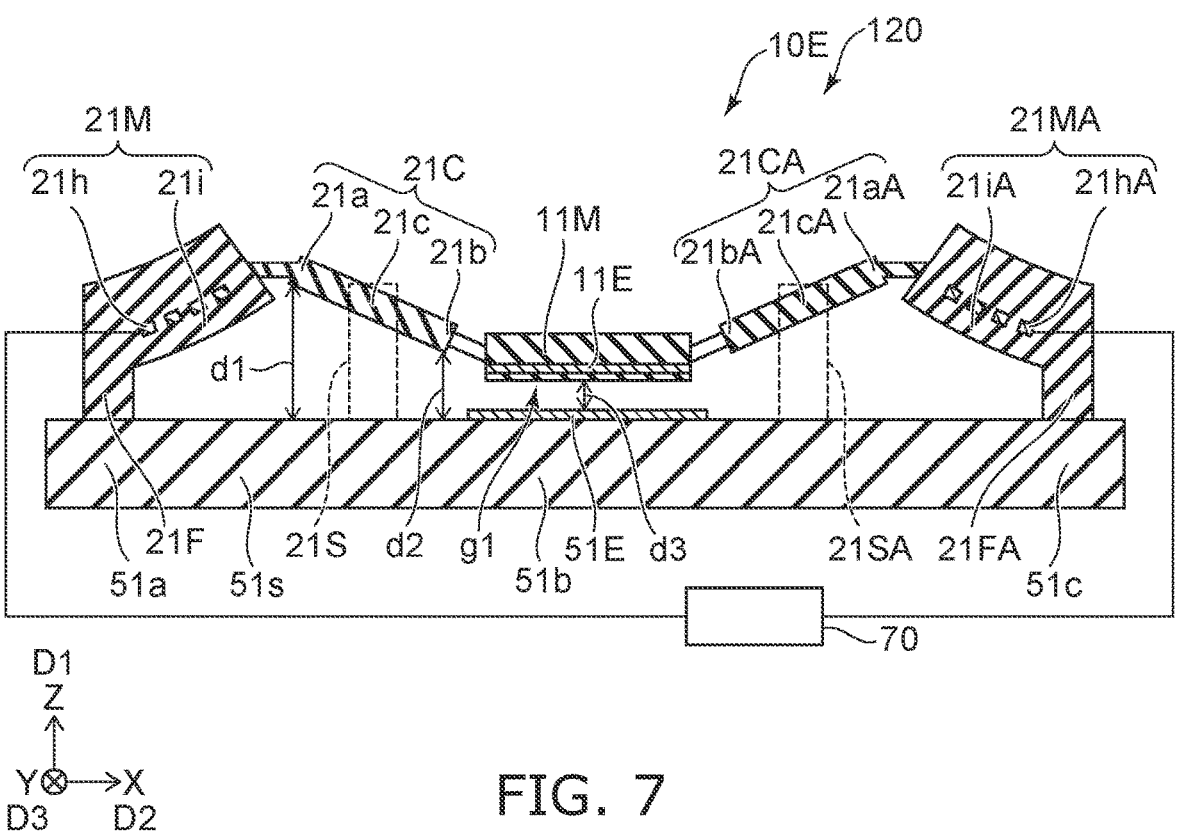
FIG. 7 is a schematic cross-sectional view illustrating the capacitor device according to the second embodiment.

FIG. 7 is a schematic cross-sectional view illustrating the capacitor device according to the second embodiment.

FIG. 7 is a cross-sectional view taken along the line B1-B2 in FIG. 6. As shown in FIGS. 6 and 7, a capacitor device 120 according to the embodiment includes the base 51s and the element section 10E.

The base 51s includes the first base region 51a and the second base region 51b. The base 51s may include the third base region 51c.

The element section 10E includes the fixed electrode 51E, the first fixed member 21F, the first intermediate member 21M, the first connecting member 21C, the movable portion, and the first support member 21S. Their configuration may be the same as the configuration of the sensors 110-112. In capacitor device 120, the first intermediate member 21M includes the first conductive member 21h.

By supplying the current to the first conductive member 21h, the inter-electrode distance d3 can be controlled. For example, when current is supplied to the first conductive member 21h, the first distance d1 between the base 51s and the first connecting portion 21a along the first direction D1 decreases. At this time, the second distance d2 between the base 51s and the second connecting portion 21b along the first direction D1 increases. As a result, the inter-electrode distance d3 changes and the capacitance changes.

The capacitor device 120 may include the controller 70. The controller 70 is configured to supply the current to the first conductive member 21h.

In the capacitor device 120, the third direction D3 from the first support member 21S to the third connecting portion 21c crosses a plane including the first direction D1 and the second direction D2.

The element section 10E may further include the first opposing support member 21Sx. The first opposing support member 21Sx is fixed to the base 51s. The first opposing support member 21Sx supports the third connecting portion 21c. The third connecting portion 21c is located between the first support member 21S and the first opposing support member 21Sx. A part of the first gap g1 is provided between the base 51s and the first connecting member 21C.

According to the embodiment, a capacitor device with high controllability can be provided. For example, the control range of capacitance is wide. The capacitance can be controlled with high accuracy.

The embodiments may include the following configurations (for example, technical proposals).

Configuration 1

A sensor, comprising:
a base including a first base region and a second base region; and
an element section,
the element section including
  a fixed electrode fixed to the second base region,
  a first fixed member fixed to the first base region,
  a first intermediate member supported by the first fixed member,
  a first connecting member supported by the first intermediate member, the first connecting member including a first connecting portion, a second connecting portion, and a third connecting portion between the first connecting portion and the second connecting portion, a direction from the first connecting portion to the second connecting portion being along a second direction crossing a first direction from the first base region to the first fixed member, a movable portion connected to the second connecting portion, the movable portion including a movable electrode, a first gap being provided between the fixed electrode and the movable portion, and
  a first support member fixed to the base, the first support member supporting the third connecting portion.

Configuration 2

The sensor according to Configuration 1, wherein
a third direction from the first support member to the third connecting portion crosses a plane including the first direction and the second direction.

Configuration 3

The sensor according to Configuration 2, wherein
the element section further includes a first opposing support member,
the first opposing support member is fixed to the base,
the first opposing support member supports the third connecting portion,
the third connecting portion is located between the first support member and the first opposing support member, and
a part of the first gap is provided between the base and the first connecting member.

Configuration 4

The sensor according to any one of Configurations 1-3, wherein
when a first distance between the base and the first connecting portion along the first direction decreases, a second distance between the base and the second connecting portion along the first direction increases.

Configuration 5

The sensor according to any one of Configurations 1-3, wherein
a first distance along the first direction between the base and the first connecting portion in a first state is shorter than the first distance in a second state, and
a second distance along the first direction between the base and the second connecting portion in the first state is longer than the second distance in the second state.

Configuration 6

The sensor according to Configuration 5, wherein
a concentration of a detection target existing around the element section in the first state is higher than the concentration of the detection target in the second state.

Configuration 7

The sensor according to Configuration 6, wherein
the first intermediate member includes a first layer,
the first layer includes at least one selected from the group consisting of palladium, platinum and gold, and
the detection target includes hydrogen.

Configuration 8

The sensor according to Configuration 7, wherein
the first intermediate member further includes a first
insulating layer, and
the first insulating layer is located between the base and
the first layer.

Configuration 9

The sensor according to any one of Configurations 1-8,
wherein
the base further includes a third base region,
the element section further includes a first other fixed
member, a first other intermediate member, a first other
connecting member, and a first other support member,
the second base region is located between the first base
region and the third base region,
the first other fixed member is fixed to the third base
region,
the first other intermediate member is supported by the
first other fixed member,
the first other connecting member is supported by the first
other intermediate member,
the first other connecting member includes a first other
connecting portion, a second other connecting portion,
and a third other connecting portion between the first
other connecting portion and the second other connect-
ing portion,
a direction from the second other connecting portion to
the first other connecting portion is along the second
direction,
the first other connecting portion is supported by the first
other intermediate member,
the second other connecting portion supports the movable
portion, and
the first other support member is fixed to the base and
supports the third other connecting portion.

Configuration 10

The sensor according to Configuration 9, wherein
the element section further includes a first other opposing
support member,
the first other opposing support member is fixed to the
base,
the first other opposing support member supports the third
other connecting portion,
the third other connecting portion is located between the
first other support member and the first other opposing
support member, and
a part of the first gap is provided between the base and the
first other connecting member.

Configuration 11

The sensor according to any one of Configurations 1-3,
wherein
the first intermediate member further includes a first
conductive member,
when a current is supplied to the first conductive member,
a first distance between the base and the first connect-
ing portion along the first direction decreases, and a
second distance between the base and the second
connecting portion along the first direction increases.

Configuration 12

The sensor according to Configuration 11, further com-
prising:
a controller configured to supply the current to the first
conductive member.

Configuration 13

A sensor, comprising:
a base including a first base region and a second base
region; and
an element section,
the element section including
a fixed electrode fixed to the second base region,
a first fixed member fixed to the first base region,
a first intermediate member including a first conductive
member, the first intermediate member being sup-
ported by the first fixed member,
a first connecting member supported by the first inter-
mediate member, the first connecting member
including a first connecting portion, a second con-
necting portion, and a third connecting portion
between the first connecting portion and the second
connecting portion, a direction from the first con-
necting portion to the second connecting portion
being along a second direction crossing a first direc-
tion from the first base region to the first fixed
member,
a movable portion connected to the second connecting
portion, the movable portion including a movable
electrode, a first gap being provided between the
fixed electrode and the movable portion,
a first support member fixed to the base, the first
support member supporting the third connecting
portion.

Configuration 14

The sensor according to Configuration 13, wherein
when a current is supplied to the first conductive member,
a first distance between the base and the first connect-
ing portion along the first direction decreases, and a
second distance between the base and the second
connecting portion along the first direction increases.

Configuration 15

The sensor according to Configuration 14, further com-
prising:
a controller configured to supply the current to the first
conductive member.

Configuration 16

A capacitor device, comprising:
a base including a first base region and a second base
region; and
an element section,
the element section including
a fixed electrode fixed to the second base region,
a first fixed member fixed to the first base region,
a first intermediate member including a first conductive
member, the first intermediate member being sup-
ported by the first fixed member,
a first connecting member supported by the first inter-
mediate member, the first connecting member including a first connecting portion, a second connecting portion, and a third connecting portion between the first connecting portion and the second connecting portion, a direction from the first connecting portion to the second connecting portion being along a second direction crossing a first direction from the first base region to the first fixed member, a movable portion connected to the second connecting portion, the movable portion including a movable electrode, a first gap being provided between the fixed electrode and the movable portion, a first support member fixed to the base, the first support member supporting the third connecting portion.

Configuration 17

The capacitor device according to Configuration 16, wherein when a current is supplied to the first conductive member, a first distance between the base and the first connecting portion along the first direction decreases, and a second distance between the base and the second connecting portion along the first direction increases.

Configuration 18

The capacitor device according to Configuration 17, further comprising:

a controller configured to supply the current to the first conductive member.

Configuration 19

The capacitor device according to any one of Configurations 16-18, wherein a third direction from the first support member to the third connecting portion crosses a plane containing the first direction and the second direction.

Configuration 20

The capacitor device according to any one of Configurations 16-19, wherein the element section further includes a first opposing support member, the first opposing support member is fixed to the base, the first opposing support member supports the third connecting portion, and the third connecting portion is located between the first support member and the first opposing support member, and a part of the first gap is provided between the base and the first connecting member.

According to the embodiments, it is possible to provide a sensor and capacitor device capable of improving characteristics.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and capacitor devices such as, bases, element sections, fixed electrodes, fixed members, intermediate members, connecting members, movable portions, support members, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and capacitor devices practicable by an appropriate design modification by one skilled in the art based on the sensors and the capacitor devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

a base including a first base region and a second base region; and an element section, the element section including a fixed electrode fixed to the second base region, a first fixed member fixed to the first base region, a first intermediate member supported by the first fixed member, a first connecting member supported by the first intermediate member, the first connecting member including a first connecting portion, a second connecting portion, and a third connecting portion between the first connecting portion and the second connecting portion, a direction from the first connecting portion to the second connecting portion being along a second direction crossing a first direction from the first base region to the first fixed member, a movable portion connected to the second connecting portion, the movable portion including a movable electrode, a first gap being provided between the fixed electrode and the movable portion, and a first support member fixed to the base, the first support member supporting the third connecting portion, wherein when a first distance between the base and the first connecting portion along the first direction decreases, a second distance between the base and the second connecting portion along the first direction increases.

2. The sensor according to claim 1, wherein a third direction from the first support member to the third connecting portion crosses a plane including the first direction and the second direction.

3. The sensor according to claim 2, wherein the element section further includes a first opposing support member, the first opposing support member is fixed to the base, the first opposing support member supports the third connecting portion, the third connecting portion is located between the first support member and the first opposing support member, and a part of the first gap is provided between the base and the first connecting member.

4. The sensor according to claim 1, wherein the base further includes a third base region, the element section further includes a first other fixed member, a first other intermediate member, a first other connecting member, and a first other support member, the second base region is located between the first base region and the third base region, the first other fixed member is fixed to the third base region, the first other intermediate member is supported by the first other fixed member, the first other connecting member is supported by the first other intermediate member, the first other connecting member includes a first other connecting portion, a second other connecting portion, and a third other connecting portion between the first other connecting portion and the second other connecting portion, a direction from the second other connecting portion to the first other connecting portion is along the second direction, the first other connecting portion is supported by the first other intermediate member, the second other connecting portion supports the movable portion, and the first other support member is fixed to the base and supports the third other connecting portion.

5. The sensor according to claim 4, wherein the element section further includes a first other opposing support member, the first other opposing support member is fixed to the base, the first other opposing support member supports the third other connecting portion, the third other connecting portion is located between the first other support member and the first other opposing support member, and a part of the first gap is provided between the base and the first other connecting member.

6. The sensor according to claim 1, wherein the first intermediate member further includes a first conductive member, when a current is supplied to the first conductive member, a first distance between the base and the first connecting portion along the first direction decreases, and a second distance between the base and the second connecting portion along the first direction increases.

7. The sensor according to claim 6, further comprising:

a controller configured to supply the current to the first conductive member.

8. A sensor, comprising:

a base including a first base region and a second base region; and an element section, the element section including a fixed electrode fixed to the second base region, a first fixed member fixed to the first base region, a first intermediate member supported by the first fixed member, a first connecting member supported by the first intermediate member, the first connecting member including a first connecting portion, a second connecting portion, and a third connecting portion between the first connecting portion and the second connecting portion, a direction from the first connecting portion to the second connecting portion being along a second direction crossing a first direction from the first base region to the first fixed member, a movable portion connected to the second connecting portion, the movable portion including a movable electrode, a first gap being provided between the fixed electrode and the movable portion, and a first support member fixed to the base, the first support member supporting the third connecting portion, wherein a first distance along the first direction between the base and the first connecting portion in a first state is shorter than the first distance in a second state, and a second distance along the first direction between the base and the second connecting portion in the first state is longer than the second distance in the second state.

9. The sensor according to claim 8, wherein a concentration of a detection target existing around the element section in the first state is higher than the concentration of the detection target in the second state.

10. The sensor according to claim 9, wherein the first intermediate member includes a first layer, the first layer includes at least one selected from the group consisting of palladium, platinum and gold, and the detection target includes hydrogen.

11. The sensor according to claim 10, wherein the first intermediate member further includes a first insulating layer, and the first insulating layer is located between the base and the first layer.

12. A sensor, comprising:

a base including a first base region and a second base region; and an element section, the element section including a fixed electrode fixed to the second base region, a first fixed member fixed to the first base region, a first intermediate member including a first conductive member, the first intermediate member being supported by the first fixed member, a first connecting member supported by the first intermediate member, the first connecting member including a first connecting portion, a second connecting portion, and a third connecting portion between the first connecting portion and the second connecting portion, a direction from the first connecting portion to the second connecting portion being along a second direction crossing a first direction from the first base region to the first fixed member, a movable portion connected to the second connecting portion, the movable portion including a movable electrode, a first gap being provided between the fixed electrode and the movable portion, a first support member fixed to the base, the first support member supporting the third connecting portion, wherein when a current is supplied to the first conductive member, a first distance between the base and the first connecting portion along the first direction decreases, and a second distance between the base and the second connecting portion along the first direction increases.

13. The sensor according to claim 12, further comprising:

a controller configured to supply the current to the first conductive member.

14. A capacitor device, comprising:

a base including a first base region and a second base region; and an element section, the element section including a fixed electrode fixed to the second base region, a first fixed member fixed to the first base region, a first intermediate member including a first conductive member, the first intermediate member being supported by the first fixed member, a first connecting member supported by the first intermediate member, the first connecting member including a first connecting portion, a second connecting portion, and a third connecting portion between the first connecting portion and the second connecting portion, a direction from the first connecting portion to the second connecting portion being along a second direction crossing a first direction from the first base region to the first fixed member, a movable portion connected to the second connecting portion, the movable portion including a movable electrode, a first gap being provided between the fixed electrode and the movable portion, a first support member fixed to the base, the first support member supporting the third connecting portion, wherein when a current is supplied to the first conductive member, a first distance between the base and the first connecting portion along the first direction decreases, and a second distance between the base and the second connecting portion along the first direction increases.

15. The capacitor device according to claim 14, further comprising:

a controller configured to supply the current to the first conductive member.

16. The capacitor device according to claim 14, wherein a third direction from the first support member to the third connecting portion crosses a plane containing the first direction and the second direction.

17. The capacitor device according to claim 14, wherein the element section further includes a first opposing support member, the first opposing support member is fixed to the base, the first opposing support member supports the third connecting portion, and the third connecting portion is located between the first support member and the first opposing support member, and a part of the first gap is provided between the base and the first connecting member.

* * * * *